June 10, 1930. J. K. MORRIS 1,762,732
DEVICE FOR EXPANDING SHORT PIPES
Filed March 14, 1929
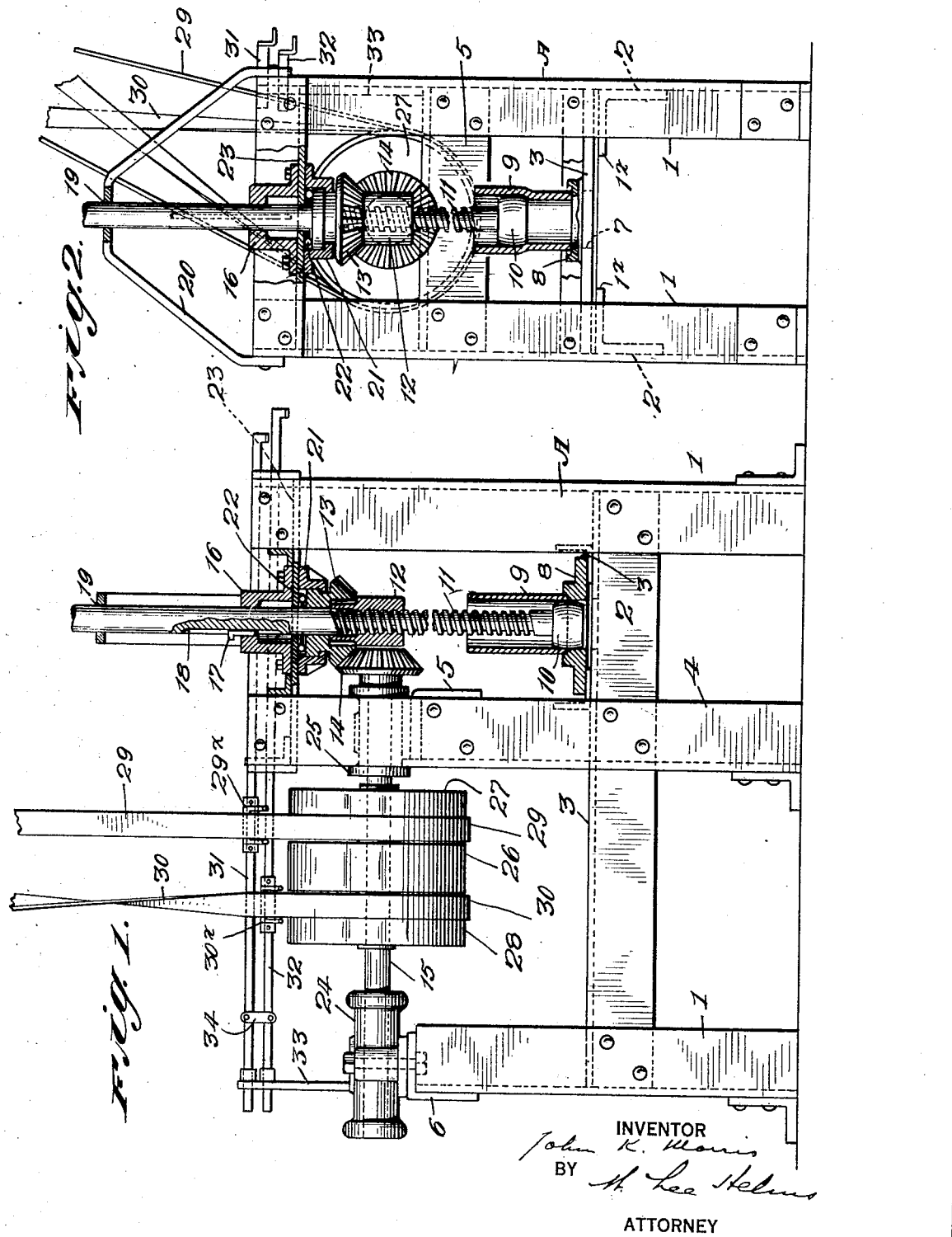
INVENTOR
John K. Morris
BY H. Lee Helms
ATTORNEY Patented June 10, 1930

1,762,732

UNITED STATES PATENT OFFICE

JOHN K. MORRIS, OF RICHMOND HILL, NEW YORK

DEVICE FOR EXPANDING SHORT PIPES

Application filed March 14, 1929. Serial No. 346,837.

The object of the present invention is to provide a device for rapidly expanding short lengths of tubes. These tubes are used as connecting elements and a specific object of the invention is to provide means for setting the lengths of pipe vertically in such manner as to enable the passage of an expander downwardly through the same followed by a rapid withdrawal action of the screw through which the expander is actuated, the expander passing through the pipe and then dropping out below it. A further object of the invention is to provide simple power-driven means resistant to the substantial stresses generated by the expanding action.

The invention will be described with reference to the accompanying drawing, in which—

Fig. 1 is a front elevation, partly in section, of a device constructed in accordance with the invention; and Fig. 2 is an end elevation, partly in section, of the same.

In the drawings A indicates a frame comprising opposed end sections, each having the vertical legs 1, formed of angle iron, each section being connected by opposed angle irons 2 bolted to the end sections and having horizontal members 1× which support a table 3. The frame may be reinforced by an intermediate set of opposed members 4 and said members may be joined by the angular cross-piece 5. One set of end members may be connected by an angle iron 6 for a purpose hereinafter to be described.

Table 3 is formed with an aperture indicated by dotted lines at 7, above which aperture is placed a seat plate 8 adapted to receive the pipe 9 to be expanded.

The expander head 10 at the beginning of its action is placed below a screw 11 vertically arranged in the device and engaged by a worm 12 keyed to a beveled gear 13 and driven by a beveled gear 14 on main drive shaft 15.

Worm shaft 11 passes through the hub of gear 13 and thence upwardly through a suitable aperture in housing 16. Housing 16 is provided with a guide slot in which slot is a key 17 disposed within channel 18 in the screw 11 for preventing rotation of the screw 11 while permitting its endwise movement. Near its top the worm shaft passes through the guide aperture 19 of a bracket 20 bolted upon the top of the frame housing 16 and bolted to the upper surface of cross plate 23.

The hub of beveled gear 13 is disposed within a housing 21 and the top face of the hub is in engagement with a thrust bearing 22 which in turn engages a suitable member such as cross plate 23 of the frame which lower housing 21 is supported by and below the cross plate 23.

Cross plate 6 has suitably secured thereto a bearing member 24 of any suitable construction, which member is adapted to receive shaft 15. The shaft also is held by a suitable bearing member 25 carried by cross frame member 5.

Shaft 15 carries a fixed pulley 26 and two loose pulleys 27, 28. From a single overhead drive drum (not shown) extends a drive belt 29 and twisted drive belt 30. Belt 29 is engaged by the shift bracket 29× on belt shift 31 and belt 30 is engaged by the shift bracket 30× of belt shift member 32. The belt shift members may be guided by suitable bearing members carried by bracket 33 and they may be operated independently or may be connected by strap 34 for simultaneous actuation. If the belts are shifted to the left from their position in Fig. 1, belt 30 will move idly to the left of pulley 28 and belt 29 will move upon fixed pulley 26 and thereby give a rotation to shaft 15. If the belts are shifted in a reverse direction, belt 29 will be moved to the right of pulley 27 while belt 30 will move upon fixed pulley 26 to give a reverse rotation to drive shaft 15.

Having described my invention what I claim and desire to secure by Letters Patent is as follows:—

1. A device for expanding short lengths of tubes, comprising a supporting frame, a seat adapted to receive the pipe, said seat having a passageway for an expander, a screw having an expander head below it, a lower housing through which the screw passes, means carried by an upper housing for holding the screw against rotation but permitting its endwise movement, a worm for the screw, gear devices for rotating the worm, and power-driven means for imparting reversely directed movements to the gear devices.

2. In devices of the character set forth, a frame, a horizontal table carried by the frame, a pipe supporting seat having an aperture for the passage of an expander, a worm adapted to engage an expander and move the same through a pipe and into the seat, a lower housing adapted to guide the screw, rotating means for the screw and a thrust bearing for said means, means carried by an upper housing for preventing rotation of the screw but permitting its endwise movement, a horizontal shaft supported by the frame and connected with said screw rotating means, a pulley fixed to the shaft, opposed idler pulleys, a drive belt for each idler pulley, means for simultaneously shifting the belts so that one belt will be moved on the shaft-fixed pulley while the second belt is being moved to an idler pulley, substantially as shown and described.

In testimony whereof I have signed my name to this specification.

JOHN K. MORRIS.